US00RE34775E

United States Patent [19]

Nechvatal et al.

[11] E Patent Number: Re. 34,775

[45] Reissued Date of Patent: Nov. 1, 1994

[54] LIGHTWEIGHT AGGREGATE FROM FLYASH AND SEWAGE SLUDGE

[75] Inventors: Timothy M. Nechvatal, Waukesha; Glenn A. Heian, Franklin, both of Wis.

[73] Assignee: Minergy Corp., Milwaukee, Wis.

[21] Appl. No.: 101,516

[22] Filed: Aug. 2, 1993

Related U.S. Patent Documents

Reissue of:

[64] Patent No.: 5,057,009
Issued: Oct. 15, 1991
Appl. No.: 640,184
Filed: Jan. 11, 1991

[51] Int. Cl.[5] ..... F27B 15/00

[52] U.S. Cl. ..... 432/14; 110/347; 110/165 A; 110/246

[58] Field of Search ..... 110/221, 223, 224, 226, 110/165 A, 347; 432/14, 103

[56] References Cited

U.S. PATENT DOCUMENTS

| | | | |
|---|---|---|---|
| 1,895,159 | 1/1933 | Greenawalt . | |
| 1,942,769 | 1/1934 | Peffer et al. . | |
| 2,948,948 | 8/1960 | Duplin, Jr. et al. . | |
| 3,030,222 | 4/1962 | Eichenlaub | 501/155 |
| 3,600,476 | 8/1971 | Suzuki et al. . | |
| 3,702,257 | 11/1972 | Koning . | |
| 3,765,920 | 10/1973 | Humphrey | 106/288 B |
| 3,949,685 | 4/1976 | Replogle | 110/165 A |
| 3,973,973 | 8/1976 | Leach | 106/40 R |
| 4,028,130 | 6/1977 | Webster et al. | 106/120 |
| 4,081,285 | 3/1978 | Pennell | 106/100 |
| 4,208,217 | 6/1980 | Anderson et al. | 106/97 |
| 4,210,457 | 7/1980 | Dodson et al. | 106/97 |
| 4,226,630 | 10/1980 | Styron . | |
| 4,340,396 | 7/1982 | Robinson-Todd | 23/293 R |
| 4,344,796 | 8/1982 | Minnick | 106/84 |
| 4,375,986 | 3/1983 | Pichat | 106/85 |
| 4,377,414 | 3/1983 | Buschmann et al. | 106/85 |
| 4,432,666 | 2/1984 | Frey et al. . | |
| 4,614,711 | 11/1986 | Styron | 106/308 S |
| 4,751,887 | 6/1988 | Terry et al. | 110/246 |
| 4,776,288 | 10/1988 | Beisswenger et al. | 110/347 |
| 4,796,545 | 1/1989 | Hashizaki et al. | 110/165 A |
| 4,831,943 | 5/1989 | Aune | 110/165 A |
| 4,900,360 | 2/1990 | Whitescarver et al. | 106/97 |
| 4,902,431 | 2/1990 | Nicholsen et al. | 210/751 |
| 4,947,767 | 8/1990 | Collette | 110/246 |
| 4,977,837 | 12/1990 | Roos et al. | 110/165 A |
| 5,018,459 | 5/1991 | Judd | 110/346 |

OTHER PUBLICATIONS

Title page and abstract, Coal Waste Artificial Reef Program, Phase 3, vol. 2: Comprehensive Report, Nov. 1981.

Grant Application of Greengrove Corporation to State of Wisconsin, Department of Natural Resources, Aug. 1, 1991.

*Primary Examiner*—Henry C. Yuen
*Attorney, Agent, or Firm*—Quarles & Brady

[57] ABSTRACT

A method is shown for producing a lightweight aggregate by treating flyash and sewage sludge. The flyash and sewage sludge are mixed together and then agglomerated into pellets, with or without the use of a binder. The pellets may be coated and then are dried. The dried pellets are introduced into a rotary kiln in a direction that is co-current with the flow of fuel and air through the kiln. The pellets in the kiln will be indurated and will experience complete calcination as well as varying degrees of pyrolizing and sintering. The product of the kiln is a nodular material having a low density but with a hard and porous structure. The product of the kiln is feed to a cooler. The flyash sewage sludge mixture has a significant fuel value that is usable in the kiln. Furthermore, the fuel valve available in the kiln off-gases may be used for drying the materials.

23 Claims, 2 Drawing Sheets

LIGHTWEIGHT AGGREGATE FROM FLYASH AND SEWAGE SLUDGE

Matter enclosed in heavy brackets [ ] appears in the original patent but forms no part of this reissue specification; matter printed in italics indicates the additions made by reissue.

BACKGROUND OF THE INVENTION

This invention relates to a treatment of flyash and sewage sludge, and particularly to the production of a lightweight aggregate from a mixture of flyash and sewage sludge.

Flyash is a particulate by-product produced from the burning of coal, and particularly powdered bituminous coal. Coal burning power plants typically produce very large quantities of flyash that must be disposed of in an environmentally acceptable manner. It has been known for some time that flyash can be treated to form structural products (U.S. Pat. No. 1,942,769 issued Jan. 9, 1934 to Peffer, et al.) and that usable lightweight aggregates can be formed from treated flyash (U.S. Pat. No. 2,948,848 to Dublin, Jr., et al. issued Aug. 16, 1990; U.S. Pat. No. 3,702,257 issued Nov. 7, 1972 to Koning and U.S. Pat. No. 3,765,920 issued Oct. 16, 1973 to Humphrey). In the processes for treating the flyash, a typical step involves heating a flyash mixture and the heating is often accomplished in a rotary kiln.

Sewage sludge is the by-product of the treatment of wastewater. Sludge is the settled solids accumulated and subsequently separated from the liquid stream during various phases of the wastewater treatment process. The sludge may be from primary or secondary settling, or may be waste activated sludge. The sludge may be raw sludge, digested sludge or de-watered sludge. The characteristics of the sludge will vary depending upon the stage of treatment from which is drawn and also depending upon whether it has received treatment such as by digestion. However, a common characteristic of the sludge is that it contains significant organic materials.

Sludge has been generally disposed of by incineration followed by land disposal of the inert ash or by lagooning, landfilling, spreading on land for fertilizer or soil conditioning and ocean dumping where permitted. As with flyash, sewage sludge presents a considerable problem of disposal in an economical and environmentally sound manner.

It has been proposed by Greenawalt in U.S. Pat. No. 1,895,159 issued Jan. 24, 1933 that sewage sludge can be disposed of by mixing the sludge with a water absorptive material, such as ashes. The resulting mass is then sintered on a pervious hearth to form a hard cellular cake that would be suitable for use as aggregate for concrete. Another method of disposing of sewage sludge is taught by Webster, et al. in U.S. Pat. No. 4,028,130 issued June 7, 1977 in which digested sewage sludge is mixed with lime, flyash, and either alkaline earth metal, sulfates or soil to form an air hardenable composition that can be placed in an area open to the atmosphere and which will cure over a period a time to act as a landfill or as a road base material.

SUMMARY OF THE INVENTION

Our invention involves the mixture of sewage sludge with flyash, agglomerating the mixture such as by pellitizing, and indurating the agglomerated mixture in a rotary kiln. The resultant nodular product, after cooling, can be used as a lightweight aggregate for concretes, masonry, or insulation purposes, can be used for other commercial purposes, or can otherwise be disposed of in an environmentally sound and economical manner.

Depending on the amount of sewage sludge added to the mixture, the combustion of the organic portion of the sewage sludge will provide a significant percentage of the total heat energy required in the kiln and in other stages of the process. The sewage sludge also results in a significant weight loss from the agglomerated mixture through the formation of voids in the aggregate after volatilization or combustion of the organic portion of the sewage sludge in the kiln. Additional reduction in the aggregate product density is obtained from bloating of the pellets because of the entrapment of gases within the aggregate from the combustion of volatile organics and fixed carbon in the pellets and from calcination reactions.

The mixture may contain between about 35 to 99% flyash by dry weight and between about 1 to 65% of sewage sludge by dry weight. Preferably, the mixture will contain between about 65 to 95% flyash by dry weight to about 5 to 35% sewage sludge by dry weight.

Various binder materials may be added to the raw mixture of flyash and sewage sludge to maintain sufficient pellet strength for handling prior to the treatment in the rotary kiln. The pellets may also be coated with a coating material to prevent sticking of the pellets to each other or to the rotary kiln surfaces.

Important features of the treatment within the rotary kiln include co-current flow of pellets and gas, locating the main burner at the feed end of the kiln, a fairly flat temperature profile along the entire length of the kiln, a peak gas temperature range of about 800° to 1200° C. in the combustion and sintering zones of the kiln, and a gas composition and flow rate through the kiln that provides sufficient temperature, oxygen and retention time to fully combust carbon and volatile organic compounds. The high heat energy content in the kiln off-gas is available for energy recovery and use in drying of the agglomerated mixture of flyash and sewage sludge or in drying the sewage sludge prior to mixing with the flyash.

A principal object of this invention is to provide a method of utilizing flyash and sewage sludge by combining them and treating the combination to form a useful product.

A further object of the invention is to produce a lightweight aggregate product formed from treated and heated flyash and sewage sludge.

It is also an object of this invention to provide a method for forming a lightweight aggregate from flyash by mixing with the flyash a sewage sludge that provides a major portion of the fuel value needed in a rotary kiln treatment of the flyash.

The foregoing and other objects and advantages of the invention will appear in the following detailed description of a preferred method for carrying out the invention. In the description, reference is made to the accompanying drawing.

DETAILED DESCRIPTION OF THE INVENTION

Figure 1:
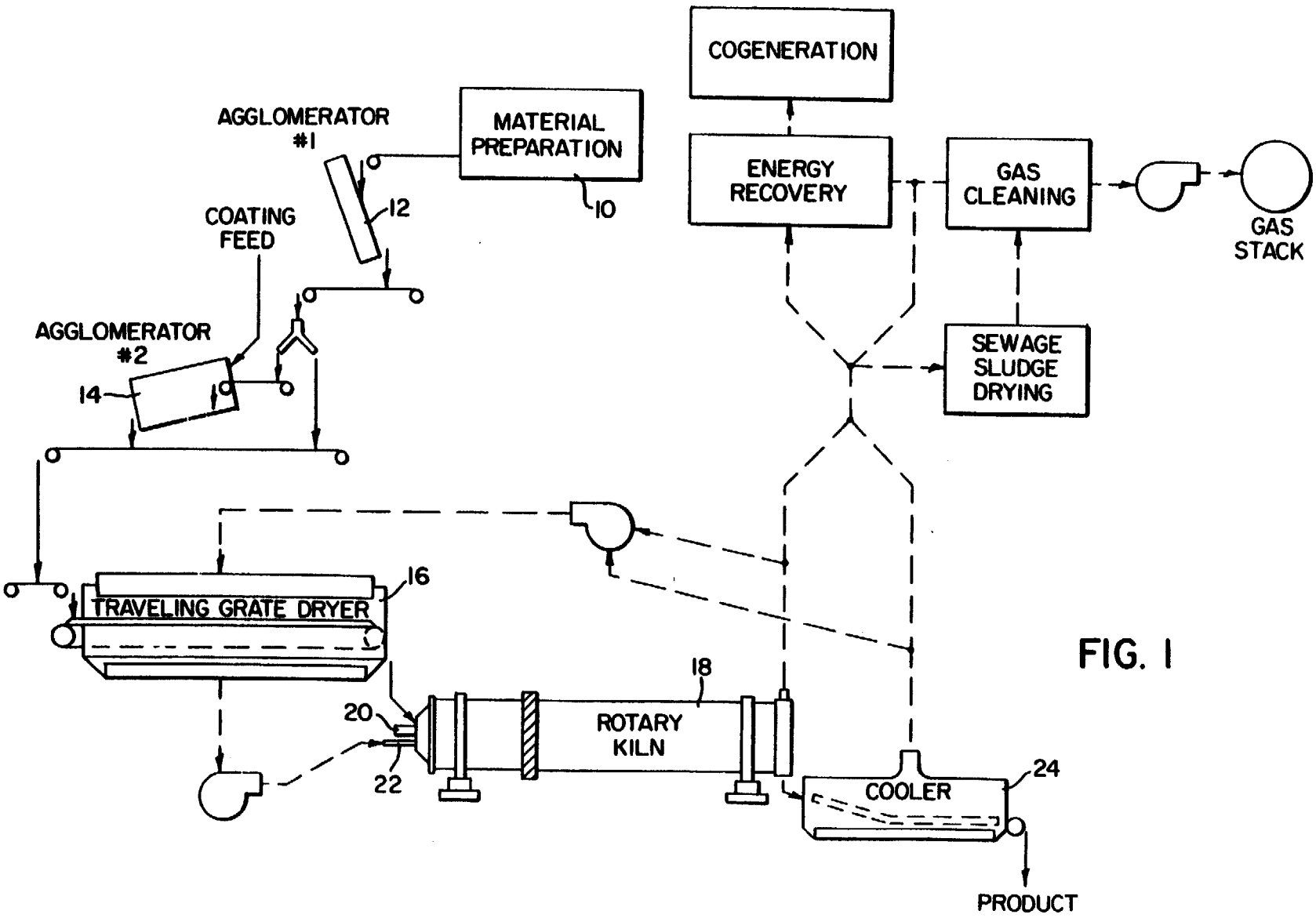
FIG. 1 illustrates the arrangement of process apparatus suitable for carrying out the method of the present invention.

Flyash can vary in its makeup depending upon its source and can also vary when obtained from a single source depending upon specific operating conditions experienced by the power plant. Typical flyashes that are useable in the present invention are represented by the flyashes produced by several upper midwestern coal fired power plants. The ultimate analysis for flyashes from these sources, including two different batches from the first source, are set forth in the following Table I:

The ash mineral analysis for the same flyash are set forth on the following Table II:

TABLE I

ULTIMATE ANALYSIS OF FLYASH

| Constituent | A-1 | A-2 | B | C | D | E |
|---|---|---|---|---|---|---|
| | Weight % | | | | | |
| Mosture | 0.00 | 0.00 | 0.00 | 0.00 | 0.00 | 0.00 |
| Carbon | 7.78 | 6.44 | 8.75 | .56 | 27.98 | .32 |
| Hydrogen | .09 | .09 | .08 | .04 | .29 | .03 |
| Nitrogen | .42 | .11 | .15 | .04 | .48 | .03 |
| Sulfur | .12 | .49 | .49 | .52 | .72 | .94 |
| Ash | 91.39 | 92.56 | 90.13 | 98.94 | 69.46 | 99.30 |
| Oxygen | .20 | .31 | .40 | −0.10 | 1.07 | −0.62 |
| TOTAL | 100.00 | 100.00 | 100.00 | 100.00 | 100.00 | 100.00 |
| Alkali As $Na_2O$, % | 2.16 | 2.09 | 2.34 | 2.46 | .96 | 1.84 |
| Loss-On-Ignition, % | 8.61 | 7.44 | 9.87 | 1.06 | 30.54 | 0.70 |
| Calorific Value (BTU/LB) | 948 | 771 | 1110 | 0 | 4100.5 | 0 |

TABLE II

MINERAL ANALYSIS OF FLYASH ASH

| Constituent | A-1 | A-2 | B | C | D | E |
|---|---|---|---|---|---|---|
| | Weight % | | | | | |
| $SiO_2$ | 50.04 | 48.95 | 49.79 | 50.79 | 47.62 | 36.35 |
| $Al_2O_3$ | 23.99 | 24.02 | 24.43 | 19.42 | 25.73 | 18.74 |
| $TiO_2$ | 1.14 | 1.13 | 1.26 | .94 | 1.11 | 1.53 |
| $Fe_2O_3$ | 15.14 | 16.16 | 16.56 | 15.14 | 17.69 | 5.54 |
| CaO | 3.69 | 3.82 | 1.89 | 5.76 | 2.87 | 26.18 |
| MgO | 1.03 | .97 | 1.07 | 1.07 | .66 | 4.61 |
| $K_2O$ | 2.12 | 2.02 | 2.74 | 2.12 | 1.38 | .38 |
| $Na_2O$ | .97 | .93 | .79 | 1.09 | .48 | 1.60 |
| $SO_3$ | .97 | 1.14 | .82 | 1.24 | 1.59 | 2.66 |
| $P_2O_5$ | .41 | .40 | .25 | .32 | .30 | 1.18 |
| SrO | .10 | .11 | .12 | .03 | .14 | .45 |
| BaO | .05 | .05 | .14 | .05 | .04 | .54 |

TABLE II-continued

MINERAL ANALYSIS OF FLYASH ASH

| Constituent | A-1 | A-2 | B | C | D | E |
|---|---|---|---|---|---|---|
| | Weight % | | | | | |
| $Mn_3O_4$ | .02 | .03 | .00 | .00 | .00 | .00 |
| Un-determined | .34 | .27 | .14 | 2.09 | .39 | .24 |
| TOTAL | 100.00 | 100.00 | 100.00 | 100.00 | 100.00 | 100.00 |

It should be noted from the above Tables I and II that the carbon content, the loss-in-ignition percentage, and the calorific values of the flyash vary widely. This is in part dependent upon the extent of incomplete combustion of the coal from which the flyash is produced and also dependent upon the type of coal that was burned. It is one of the advantages of the present invention that the loss-on-ignition of the flyash is not a particularly important parameter so that a wide variety of flyashes can be successfully used. Typical flyash has a loss-on ignition of 0 to 20%, and all such flyash can be used successfully. However, where several sources of flyash are available, there is advantage to blending flyashes from various sources to produce a final blend of flyash having loss-on-ignition of between 5 to 10%.

Sewage sludge also varies widely in its composition and characteristics. It also varies greatly in its moisture content depending upon the level of treatment at the wastewater facility. Examples of typical sludge are those produced by upper midwestern wastewater treatment facilities. The sludge from these facilities may have an ultimate analysis as shown in the following Table III, and a mineral analysis of the ash content of the sludge as shown in Table IV below:

TABLE III

ULTIMATE ANALYSIS OF SEWAGE SLUDEGE

| Constituent | X Sludge As-Rec'd. Wt. % | X Sludge Dry Wt. % | Y Sludge As-Rec'd. Wt. % | Y Sludge Dry Wt. % | Z Sludge Wet Wt. % | Z Sludge Dry Wt. % |
|---|---|---|---|---|---|---|
| Moisture | 87.48 | 0.00 | 36.85 | 0.00 | 5.00 | 0.00 |
| Carbon | 4.37 | 34.91 | 12.41 | 19.64 | 38.30 | 40.32 |
| Hydroben | .64 | 5.16 | 1.66 | 2.64 | 5.32 | 5.60 |
| Nitrogen | .63 | 5.01 | 1.07 | 1.69 | 6.00 | 6.32 |
| Sulfur | .09 | .71 | .82 | 1.29 | NA | NA |
| Ash | 4.38 | 34.96 | 38.76 | 61.39 | 23.75 | 25.00 |
| Oxygen (Diff) | 2.41 | 19.25 | 8.43 | 13.35 | 21.63 | 22.76 |
| TOTAL | 100.00 | 100.00 | 100.00 | 100.00 | 100.00 | 100.00 |
| Chlorine % | .05 | .38 | .17 | .26 | NA | NA |
| Loss-On-Ignition % | 95.62 | 65.04 | 61.24 | 38.61 | 76.25 | 75.00 |
| CALORIFIC VALUE (BTU/LB) | 783.5 | 6260 | 1866 | 2955.5 | 7214 | 7595 |

TABLE IV

MINERAL ANALYSIS OF SEWAGE SLUDGE ASH

| Constituent | X Sludge Wt. % | Y Sludge Wt. % | Z Sludge Wt. % |
|---|---|---|---|
| SiO | 13.40 | 32.88 | 40.59 |
| $Al_2O_3$ | 4.13 | 9.75 | 15.25 |
| $TiO_2$ | .70 | .70 | NA |
| $Fe_2O_3$ | 34.30 | 8.40 | 23.96 |
| CaO | 11.60 | 24.16 | 5.01 |
| MgO | 2.80 | 5.40 | 2.69 |
| $K_2O$ | 1.32 | 1.91 | NA |
| $Na_2O$ | 1.20 | .70 | NA |
| $SO_3$ | 3.02 | 5.15 | NA |
| $P_2O_5$ | 27.20 | 10.80 | 8.42 |
| Undertermined | .33 | .15 | 4.08 |
| TOTAL | 100.00 | 100.00 | 100.00 |

Before mixing with the flyash, the sludge moisture content must be reduced down to a level such that the resulting moisture content of the flyash and sewage sludge mixture is suitable for agglomeration. Depending upon the initial moisture content, such sludge drying can be accomplished by conventional and well known mechanical and thermal sludge drying processes. The initially dried sewage sludge may then require size reduction to break up any hard lumps formed during the drying and to assist in uniform dispersal in the mixing with the flyash.

The flyash and sewage sludge are then mixed in a material preparation area 10 which may include batch or continuous mixing. The moisture content of the mixed flyash and sludge should be at about 5-25% for ease of mixing and subsequent agglomeration of the mixture. The flyash and sewage sludge are mixed in a proportion to about 35 to 99% flyash by dry weight to about 1 to 65% sewage sludge by dry weight. Within that range, the preferred proportions are about 65 to 95% flyash by dry weight to about 5 to 35% sewage sludge by dry weight. For proper agglomeration, it may be necessary and desirable to add a binder such as bentonite to assist in forming the mixed particles. Such a binder should not exceed about 20% by total dry weight of the resulting mixture and preferably does not exceed about 5%. The binder may not be necessary depending upon the cohesiveness and integrity of the green agglomerated mixture.

The blended flyash and sewage sludge mixture, with or without binder, is fed to a first agglomerator 12 which agglomerates the mixture into small pellets in the range of ⅛ to ¾ inches in diameter. The green pellets produced in the first agglomerator 12 are fed to a second agglomerator 14 in which the pellets may be coated to prevent the green pellets from sticking to each other during heat treatment in the rotary kiln. The preferable coating is a low loss-on-ignition flyash. Alternatively, dolomite, limestone, portland cement or other material may be used as a coating. The coating may not be necessary, depending upon the sticking tendency of the pellets in the rotary kiln.

The green pellets with or without coating are next dried on a traveling grate dryer 16. The green pellets are dried to a moisture content that is preferably below 5%. The dried pellets are then introduced into a rotary kiln 18. The dried pellets are fed into the same end of the rotary kiln 18 from which external fuel is introduced through burners 20 and through which air is introduced through the burners 20 or air lances 22. The pellets will slowly travel through the inclined rotary kiln in the same direction (i.e., co-currently) with the direction of the flow of hot gases through the kiln. The maximum temperature in the kiln should be between about 800° and 1200° C. and the temperature profile along the length of the kiln should be relatively flat. The pellets in the kiln will be indurated. The pellets will experience complete calcination and may also experience varying degrees of pyrolizing and sintering. The outer surface of the pellets will form a shell layer which will entrap gases formed in the inner portions of the pellets resulting in pellet expansion. This will form a porous interior. The resulting product is a nodular material having a low density but with a hard and porous structure.

The product of the kiln is fed to a cooler 24, which can be water or air cooled, to bring the product temperature down to a temperature where it can be further handled and stockpiled. The heat from the cooler 24 may be recovered and used for various process purposes including drying the green pellet in the traveling grate dryer.

The sewage sludge adds significantly to the fuel value of the mixture in the kiln and significantly reduces the amount of external fuel, such as natural gas, that is required to fire the kiln. Table V below is a comparison of the fuel content of a typical flyash and sewage sludge blend in the ratio of 65% to 35%, respectively, compared to 100% flyash. It will be seen that the natural gas fuel that would be required to be added to the kiln to produce the same product rate in short tons per hour would be reduced about 85% using the blend of flyash and sewage sludge as compared with all flyash. Furthermore, there is a considerable fuel value available in the kiln off-gas and this heat energy may be used to dry the sewage sludge prior to mixing, to dry the green pellets, and for energy recovery for cogeneration or other purposes, all as shown in FIG. 1.

TABLE V

| Material | Flyash | FA/SS Blend |
|---|---|---|
| Flyash/Sludge, % | 100.00 | 65/35 |
| Calorific Value, BTU/LB | 800.96 | 2144.78 |
| Material L.O.I., % | 7.50 | 21.80 |
| Ball Moisture Content, % | 19.00 | 25.00 |
| Product Rate, STPH | 21.60 | 21.08 |
| Heat input, MM BTU/Ton. Prod. | | |
| Natural Gas Fuel | 3.93874 | .53601 |
| Material Fuel | 1.73180 | 5.13948 |
| Total | 5.67054 | 5.67549 |
| Heat Output, MMBTU/Ton Prod. | 4.40671 | 4.95480 |
| Kiln Off-Gas | | |

The cooler and/or kiln off-gases can be fed to the traveling grate dryer 16 to provide the heat source for that drying process. Unused gases will pass to gas cleanup and exit the gas stack 26.

Figure 2:
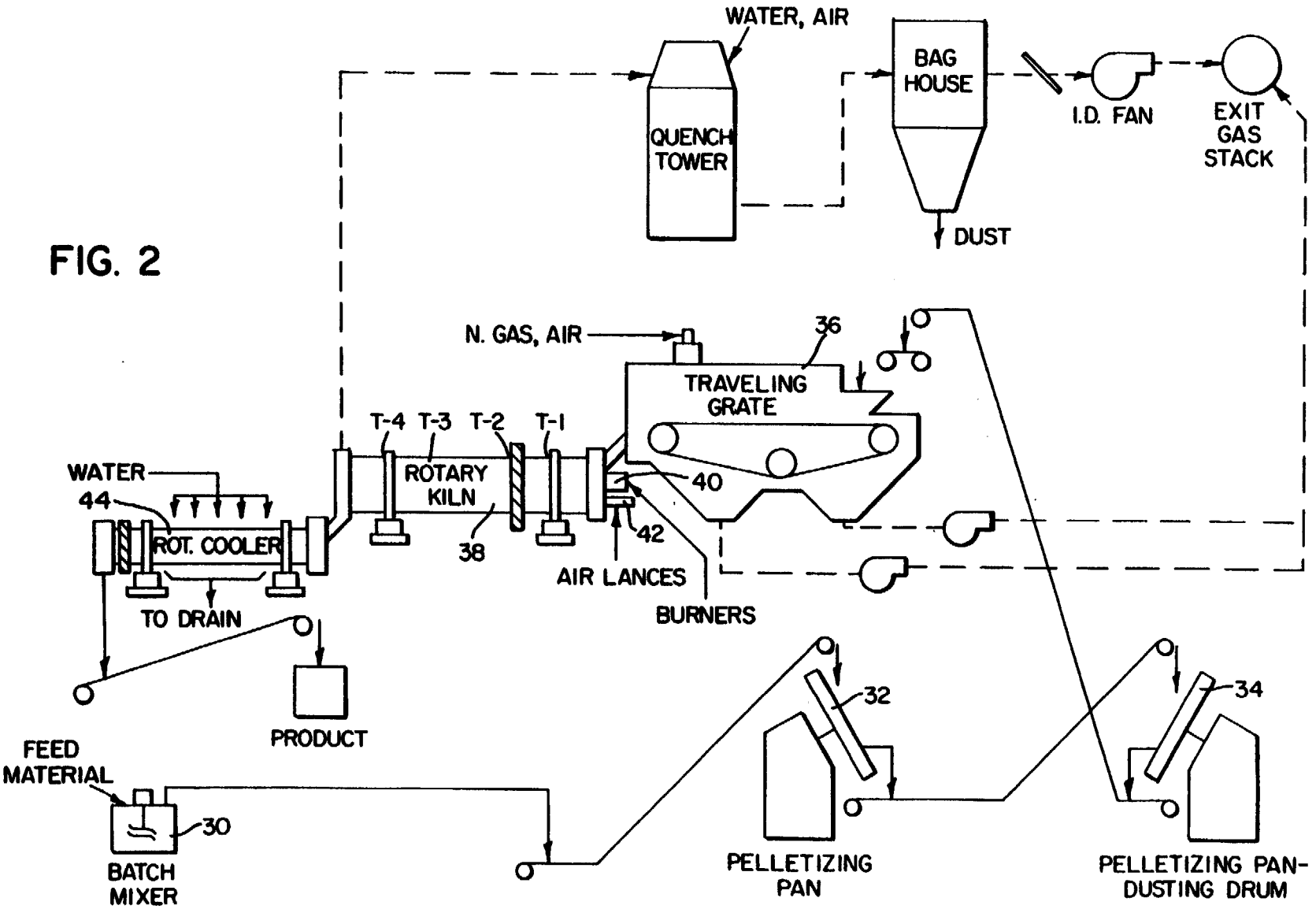
FIG. 2 illustrates a pilot plant used to test the method of the present invention.

Pilot plant studies were carried out on various blends of flyash and sewage sludge, including comparison tests of flyash without sewage sludge. The operating parameters of the kiln were also varied. The pilot plant process flow is illustrated in FIG. 2. Results of the pilot plant operations appear in Tables VI, VII and VIII.

The various blends of flyash and sewage sludge used are shown in Table VII. In almost all cases a binder in the form of bentonite was added. Furthermore, a coating was used with some of the tests mixtures, as shown in Table VI, and the coating in each instance was the low loss-on-ignition flyash C. The flyash used in each of the mixes was itself a blend of flyash from several sources. The proportions of the various components of the flyash blends were selected to achieve certain loss-on-ignition percentages. In the case of tests 1 and 2, the loss-on-ignition percentage was respectively 10 and 12.81%. For all of the tests 3 through 18 the loss-on-ignition percentage was 7.5%. The mixing of the raw material constituents was accomplished in a batch mixer 30 that imparted intense axial and radial motion to the material with a high speed blending chopper.

TABLE VI

| TEST NO. | FLYASH | MIX COMPONENTS, % Y SLUDGE | X SLUDGE | Z SLUDGE | BENTONITE | TOTAL | COATING |
|---|---|---|---|---|---|---|---|
| 1 | 97 | | | | 3 | 100 | 16 |
| 2 | 97 | | | | 3 | 100 | 16 |
| 3 | 65 | 35 | | | 0 | 100 | 0 |
| 4 | 63.5 | 34.3 | | | 2 | 100 | 0 |
| 5 | 63.05 | 33.95 | | | 3 | 100 | 16.6 |
| 6 | 33.95 | 63.05 | | | 3 | 100 | 16.6 |
| 7 | 48.5 | 48.5 | | | 3 | 100 | 16.6 |
| 8A | 48.5 | 48.5 | | | 3 | 100 | 0 |
| 8B | 48.5 | 48.5 | | | 3 | 100 | 0 |
| 9A | 48.5 | 48.5 | | | 3 | 100 | 22 |
| 9B | 48.5 | 48.5 | | | 3 | 100 | 22 |
| 10 | 48.5 | 33.95 | | 14.55 | 3 | 100 | 22 |
| 11 | 48.5 | 33.95 | | 14.55 | 3 | 100 | 0 |
| 12 | 63.05 | | 33.95 | | 3 | 100 | 23 |
| 13 | 63.05 | | 33.95 | | 3 | 100 | 0 |
| 14A | 62.4 | | 33.6 | | 4 | 100 | 0 |
| 14B | 62.4 | | 33.6 | | 4 | 100 | 0 |
| 15 | 62.4 | | 33.6 | | 4 | 100 | 20 |
| 16 | 48 | 28.8 | 19.2 | | 4 | 100 | 0 |
| 17 | 62.4 | | 19.4 | 14.4 | 4 | 100 | 20/27 |
| 18 | 77 | | | 20 | 3 | 100 | 0 |

The mixture was a fed to a 40" dia. by 6.5" deep pelletizer pan 32 rotated at between 15 and 20 RPM at a slope of 45° to 50° from the horizontal. The green balls produced in the first pelletizing pan 32 were fed to a second pelletizing pan 34 having similar characteristics, and the dry coating materials, when used, were delivered to the second pelletizing pan. Agglomerated material samples from the pelletizing step were collected and analyzed for moisture, bulk density, number of 18" drops to fracture, wet and dry compressive strengths and size to determine the quality of the green balls that had been produced. The characteristics of the green pellets produced in the various tests are set forth in Table VIII.

The green pellets were fed to a grate dryer 36 utilizing a down draft flow of gas to solids heat exchanger. The loaded cross-section of green pellets was 11" wide by 6" deep with an active drying length of 4 feet and a grate speed which was varied between under 1" per minute to in excess of 4" per minute. The drying temperature was maintained in the area of 150°–200° C. The process gas flow was adjusted to maintain the moisture content in the dried ball below 5%.

The dried pellets were fed to a rotary kiln 38 having a 22.75" inside diameter by 13' length. The feed was co-current with the firing of the rotary kiln such that the process gas stream traveled in the same direction as the solid flow. In the feed end, the incoming pellets from the grate dryer were first dried and preheated, some organic compounds were volatized and ignition of combustible materials was initiated. In the next zone, volatilization of the remaining organics occurred and burning of the combustibles in the pellets and above the tumbling bed was essentially completed. In the final heating zone, additional solids and gas resident time was provided at high temperatures to assure complete combustion and further induration of the pellets.

Two natural gas burners 40 and two air lances 42 were located in the feed end. The second burner was not used in all of the tests. The kiln 38 was operated at a speed of between 2 RPM and 3.9 RPM to achieve a solids retention time in the range of 30 to 60 minutes. The kiln slope was set at one-eighth inch per foot. Table VII sets forth the speed of operation of the kiln, the natural gas and air consumed, and the temperatures at four points T-1 through T-4 along the length of the kiln. Table VII also sets forth in the calorific value of the mixture used in each test and the loose bulk density of the resulting nodular product.

The nodular product from the kiln was transferred to a rotary cooler 44 having a 15" inside diameter by 12' length. The rotary cooler indirectly cooled the solids to below 65° C. The indirect cooling resulted from the conduction of heat through the shell to a continuously wetted external surface. The cooler slope was also one-eighth inch per foot and its speed was held constant at 6 RPM resulting in a solids retention of about 30 minutes. The resulting granular product was analyzed for bulk density and the results of those tests are set forth in Table VIII.

The resulting products from the pilot plant operations proved sufficient to satisfy the standard ASTM specifications for lightweight aggregates for structural concrete (designation C 330), lightweight aggregates for concrete masonry units (designation C 331), and lightweight aggregates for insulating concrete (designation C 332). Those specifications provide a maximum loose density of between 55 and 70 lbs per cubic foot depending upon the size distribution of the aggregate in the mix.

TABLE VII

| TEST NO. | CALORIFIC VALUE BTU/LB | SPEED RPM | PILOT PLANT KILN OPERATING DATA NATURAL GAS CFM | AIR SCFM | TEMP., °C. T-1 | T-2 | T-3 | T-4 | BULK DENSITY, LOOSE LBS./FT$^3$ |
|---|---|---|---|---|---|---|---|---|---|
| 1 | 1115.79 | 3.0 | 13.5 | 179 | NA | 1103 | 1058 | 1006 | 50.91 |
| 2 | 1465.81 | NA | NA | NA | NA | NA | NA | | 51.57 |
| 3 | 1555.05 | 2.75 | 10.8 | 169 | 956 | 986 | 935 | 940 | 45.90 |
| 4 | 1523.95 | 2.75 | 11.8 | 192 | 1020 | 1024 | 972 | 979 | 47.55 |
| 5 | 1508.40 | 2.75 | 15.7 | 204.5 | 1081 | 1027 | 1026 | 981 | 48.55 |
| 6 | 2135.37 | 2.75 | 13.6 | 210.9 | 1050 | 1000 | 1001 | 988 | 49.24 |

TABLE VII-continued

| TEST NO. | CALORIFIC VALUE BTU/LB | SPEED RPM | PILOT PLANT KILN OPERATING DATA NATURAL GAS CFM | AIR SCFM | TEMP., °C. T-1 | T-2 | T-3 | T-4 | BULK DENSITY, LOOSE LBS./FT³ |
|---|---|---|---|---|---|---|---|---|---|
| 7 | 1821.88 | 2.75 | 8.8 | 136 | 880 | 895 | 982 | 934 | 49.01 |
| 8A | 1821.88 | 2.75 | 9.4 | 131 | 938 | 919 | 978 | 923 | 46.21 |
| 8B | 1821.88 | 2.00 | 8.2 | 146 | 896 | 976 | 944 | 883 | 46.76 |
| 9A | 1821.88 | 2.75 | 10.8 | 138 | 990 | 952 | 1007 | 994 | 48.84 |
| 9B | 1821.88 | 2.00 | 8.8 | 152 | 961 | 1032 | 957 | 877 | 49.38 |
| 10 | 2440.48 | 2.00 | 7.8 | 145 | 924 | 1013 | 970 | 920 | 44.66 |
| 11 | 2440.48 | 2.00 | 9.1 | 146 | 976 | 1034 | 1017 | 976 | 48.84 |
| 12 | 2630.28 | 2.00 | 8.2 | 150 | 891 | 967 | 925 | 854 | 42.90 |
| 13 | 2630.28 | 2.00 | 7.5 | 150 | 983 | 990 | 919 | 850 | 40.99 |
| 14A | 2603.16 | 2.50 | 5.23 | 148.2 | 844 | 963 | 884 | 817 | 40.03 |
| 14B | 2603.16 | 2.00 | 5.71 | 161.6 | 871 | 951 | 874 | 808 | 37.22 |
| 15 | 2603.16 | 2.00 | 5.16 | 156.8 | 845 | 956 | 887 | 823 | 34.19 |
| 16 | 2437.56 | 2.00 | 7.45 | 156.5 | 873 | 995 | 917 | 840 | 45.34 |
| 17 | 2739.53 | 3.75 | 7.12 | 158 | 897 | 977 | 919 | 858 | 40.42 |
| 18 | 2058.14 | 2.50 | 13.3 | 133 | NA | NA | NA | NA | 45.20 |

TABLE VIII

| TEST NO. | GREEN PELLET DATA STRENGTH (LBS.) WET | DRY | NO. 18" DROPS | BULK DENSITY LBS./FT³ | PRODUCT QUALITY DATA MOISTURE % | DRY BALL L.O.I. | BULK DENSITY (LBS/FT³) LOOSE | SHAKEN | RODDED |
|---|---|---|---|---|---|---|---|---|---|
| 1 | 2.84 | 6.46 | 7.45 | 64.03 | 19.13 | 9.48 | 50.91 | 54.98 | 53.89 |
| 2 | 2.81 | 7.35 | 8.40 | 62.95 | 20.50 | 12.12 | 51.57 | 55.08 | 53.38 |
| 3 | 3.69 | 2.87 | 18.75 | 59.85 | 29.53 | 17.86 | 45.90 | 52.54 | 51.09 |
| 4 | 4.65 | 5.33 | 19.70 | 59.70 | 19.86 | 17.51 | 47.55 | 52.82 | 52.82 |
| 5 | 2.34 | 5.67 | +20 | 60.80 | 23.60 | 17.22 | 48.55 | 52.24 | 52.27 |
| 6 | 1.98 | 4.32 | +20 | 59.40 | 27.23 | 24.89 | 49.24 | 53.50 | 53.90 |
| 7 | 2.15 | 6.82 | +20 | 58.05 | 24.10 | 21.56 | 49.01 | 53.85 | 53.31 |
| 8A | 2.51 | 7.43 | +20 | 60.25 | 23.10 | 20.18 | 46.21 | 50.40 | 49.26 |
| 8B | 2.03 | 5.77 | +20 | 60.43 | 24.20 | 21.10 | 46.76 | 49.40 | 49.46 |
| 9A | 2.46 | 6.31 | +20 | 59.89 | 25.40 | 21.54 | 48.84 | 52.63 | 52.02 |
| 9B | 2.76 | 8.77 | +20 | 61.75 | 24.05 | 20.74 | 49.38 | 53.53 | 52.16 |
| 10 | 2.10 | 6.21 | +20 | 56.95 | 25.10 | 25.14 | 44.66 | 49.37 | 47.90 |
| 11 | 2.11 | 7.69 | +20 | 56.55 | 25.60 | 23.97 | 48.84 | 53.09 | 51.95 |
| 12 | 1.88 | 4.00 | +20 | 53.90 | 32.30 | 20.52 | 42.90 | 47.00 | 45.82 |
| 13 | 1.39 | 1.99 | +20 | 52.35 | 34.18 | 26.19 | 40.99 | 43.96 | 43.96 |
| 14A | 1.02 | 2.03 | +20 | 50.94 | 34.50 | 26.83 | 40.03 | 44.01 | 43.48 |
| 14B | 1.19 | 1.83 | +20 | 53.18 | 34.18 | 27.47 | 37.22 | 41.10 | 40.98 |
| 15 | 1.25 | 1.69 | +20 | 51.85 | 34.48 | 27.97 | 34.19 | 42.35 | 41.94 |
| 16 | 1.08 | 2.85 | +20 | 52.02 | 33.93 | 26.10 | 45.34 | 49.44 | 48.57 |
| 17 | 1.09 | 2.83 | +20 | 52.97 | 33.62 | 28.45 | 40.42 | 44.26 | 44.15 |
| 18 | 2.58 | 6.95 | 13.43 | 57.60 | 20.80 | 22.56 | 45.20 | 47.69 | 47.78 |

We claim:

1. A method of producing a lighweight aggregate, comprising the steps of:
   mixing flyash and sewage sludge;
   agglomerating the resulting mixture;
   drying the agglomerate; [and]
   *creating a flow of hot gases along the length of a rotary kiln;*
   *passing the dried pellets through the rotary kiln co-current with the flow of hot gases; and*
   indurating the agglomerate *while* in [a] *the* rotary kiln to a temperature below the melting point of the agglomerate.

2. A method in accordance with claim 1 wherein the agglomerating is accomplished by pelletizing the mixture.

3. A method in accordance with claim 2 together with the step of coating the pellets prior to heating of the pellets to produce an outer shell on the pellets to prevent sticking of the pellets as they are heated in the kiln.

4. A method in accordance with claim 1 wherein the flyash and sludge are mixed with a binder.

5. A method in accordance with claim 1 wherein the agglomerated mixture is heated up to about 800°-1200° C.

6. A method of treating flyash and sewage sludge for subsequent use, comprising the steps of:
   mixing flyash and sewage sludge in the proportions of about [35-99%] *35-80%* dry weight flyash with about [1-65% ] *20-65%* dry weight sludge;
   agglomerating the mixture;
   drying the agglomerated mixture to a moisture content of less than about 5% by weight;
   heating the dried agglomerated mixture in a rotary kiln to form a nodular product; and
   cooling the product of the kiln.

7. A method in accordance with claim 6 wherein the flyash and sludge are mixed with a binder in the proportion of 0-20% by dry weight.

8. A method in accordance with claim 6 wherein *a flow of hot gases is created along the length of the rotary kiln and* the dried agglomerated mixture is passed through the kiln co-current with the flow of hot gases in the kiln.

9. A method of treating flyash and sewage sludge, comprising:
   mixing flyash with sewage sludge having a high fuel value;
   agglomerating the mixture;
   drying the agglomerated mixture;

heating the agglomerated mixture to a temperature less than the melting point of the mixture in a rotary kiln using the agglomerated mixture as the principal source of fuel in the kiln to form a porous nodular product; and recovering the nodular product from the kiln.

10. A method in accordance with claim 9 wherein additional fuel is added to the kiln in an amount that is a small fraction of the total fuel required.

11. A method in accordance with claim 9 together with the step of recovering the heat content of the off-gases of the kiln.

12. A method in accordance with claim 9 together with the steps of recovering the off-gases from the kiln and using the heat value of the off-gases to dry the agglomerated mixture before it is introduced into the rotary kiln.

13. A method of producing a lightweight aggregate, comprising the steps of:

mixing flyash and sewage sludge in the proportions of about 35–99% dry weight flyash with about 1–65% dry weight sludge;

pelletizing the resulting mixture;

drying the pellets to a moisture content of less [then] *than* about 5% by weight;

*creating a flow of hot gases along the length of a rotary kiln;* passing the dried pellets through [a] *the* rotary kin co-current with the flow of hot gases to form a nodular product; and cooling the product of the kiln.

14. A method in accordance with claim 13 wherein the flyash and sludge are mixed with a binder in a proportion of up to about 20% by dry weight.

15. A method in accordance with claim 13 wherein the pellets are coated prior to being dried.

16. A method in accordance with claim 13 wherein the kiln is heated up to about 800°–1200° C.

17. A method in accordance with claim 13 wherein the heat content of the kiln off-gases is recovered.

18. A method in accordance with claim 17 wherein the recovered heat content is used to supply heat value for drying the sludge prior to mixing and for drying the pellets.

19. A method in accordance with claim 13 wherein the heat removed from the product during cooling is used to dry the agglomerated mixture.

*20. A method of treating flyash and sewage sludge, comprising the steps of:*

*mixing flyash and sewage sludge;*

*pelletizing the resulting mixture;*

*creating a flow of hot gases along the length of a rotary kiln;*

*passing the pellets through the rotary kiln co-current with the flow of hot gases to form a nodular product; and*

*adding air to the kiln sufficient to completely combust the pellets within the kiln while heating the pellets to a temperature that is below the melting point of the pellets.*

*21. A method in accordance with claim 20 wherein the flyash and sludge are mixed in the proportions of about 35–80% dry weight flyash with about 20–65% dry weight sludge.*

*22. A method of treating flyash and sewage sludge, comprising the steps of:*

*mixing flyash and sewage sludge;*

*pelletizing the resulting mixture;*

*introducing fuel through a burner into one end of a rotary kiln with the result that hot gases will flow within the kiln from the one end toward the other end of the kiln;*

*introducing air separate from air introduced with the fuel into the one end of the kiln sufficient to completely combust the pellets in the kiln; and*

*introducing the pellets into the one end of the kiln and passing the pellets through the kiln co-current with the flow of hot gases to form a nodular product while heating the pellets to a temperature below the melting point of the pellets.*

*23. A method of treating flyash and sewage sludge, comprising the steps of:*

*mixing flyash and sewage sludge;*

*pelletizing the resulting mixture;*

*introducing fuel and air into a rotary kiln to create a flow of hot gases through the kiln and to maintain a substantially flat temperature profile along the length of the kiln and wherein the temperature is below the melting point of the pellets; and*

*passing the pellets through the rotary kiln co-current with the flow of hot gases.*

* * * * *

UNITED STATES PATENT AND TRADEMARK OFFICE

CERTIFICATE OF CORRECTION

Patent No. : Re. 34,775

Dated : Nov. 1, 1994

Inventor(s) : Timothy M. Nechvatal and Glenn A. Heian

It is certified that error appears in the above-identified patent and that said Letters Patent is hereby corrected as shown below:

Col. 9, Line 44 (claim 1) change "lighweight" to --lightweight--

Signed and Sealed this

Second Day of May, 1995

*Attest:*

Bruce Lehman

BRUCE LEHMAN

*Attesting Officer*

*Commissioner of Patents and Trademarks*